United States Patent [19]

Eiriksson

[11] Patent Number: 5,261,854
[45] Date of Patent: Nov. 16, 1993

[54] SCALLOP CLEANER

[76] Inventor: Trausti Eiriksson, Klapparstigur 18, 101 Keykjavik, Iceland

[21] Appl. No.: 841,622

[22] Filed: Feb. 25, 1992

[51] Int. Cl.$^5$ .............................................. A22C 29/04
[52] U.S. Cl. ................................. 452/19; 452/107; 452/119
[58] Field of Search ...................... 452/12, 18, 19, 20, 452/107, 119

[56] References Cited

U.S. PATENT DOCUMENTS

| Re. 31,527 | 3/1984 | Lambert . | |
|---|---|---|---|
| 2,823,414 | 2/1958 | Seal | 452/12 |
| 3,129,456 | 4/1964 | Renfroe . | |
| 3,257,684 | 6/1966 | Wenstrom . | |
| 3,528,124 | 9/1970 | Wenstrom . | |
| 3,562,855 | 2/1971 | Willis . | |
| 3,662,432 | 5/1972 | Wenstrom . | |
| 3,665,554 | 5/1972 | Wenstrom . | |
| 3,665,555 | 5/1972 | Willis . | |
| 3,802,029 | 4/1974 | Martin . | |
| 3,964,131 | 6/1976 | Snow | 452/18 |
| 4,675,946 | 6/1987 | Bunge . | |

Primary Examiner—Bruce M. Kisliuk
Assistant Examiner—Jack Lavinder
Attorney, Agent, or Firm—Cushman, Darby & Cushman

[57] ABSTRACT

An improved apparatus and method for eviscerating scallops and other shellfish is provided which includes a cylindrical drum having side walls formed from a plurality of rollers mounted between a pair of rims which define the longitudinal ends of the drum. A drive mechanism is provided for rotating adjacent rollers to rotate in opposite directions. Each of the rollers has a frictional surface to allow adjacent rollers to grip the viscera and pull it from the edible muscle as the rollers are rotated. A drive mechanism is also provided for rotating the drum about its longitudinal axis. To divide the drum into a plurality of sections to ensure sufficient contact of the scallops being cleaned with the viscera removing rollers and to allow the capacity of the drum to be maximized, radial plates are mounted within the drum and are rotated with it. Furthermore, to discharge the cleaned scallops from the drum processor, longitudinal plates are mounted to the rims of the drum at spaced locations about its circumference. By longitudinally shifting a sliding door-like plate at the downstream end of each of the longitudinal plates, an opening of variable size is defined for allowing cleaned scallops to exit the drum.

19 Claims, 5 Drawing Sheets

SCALLOP CLEANER

BACKGROUND OF THE INVENTION

1. Field of the Invention

The invention relates to a method and apparatus for processing shucked scallops to remove the viscera from the edible muscle.

2. Description of the Related Art

Shellfish processing can take place either on board ship or ashore. To open the shell to retrieve the fish, the shell is placed in fresh water for 6 to 8 hours and then in boiling water for a short period (see U.S. Pat. No. 3,662,432). The contents of the shell are then retrieved for further processing. With bi-valves such as scallops, only one muscle is used for human consumption. That muscle, which is identified by consumers as the scallop, is the adductor muscle which opens and closes the shell. The shellfish's organs and other inedible portions of the shellfish, called the viscera, are attached to the scallop after the shell has opened in the hot bath. The viscera must be cleaned from the scallop to produce an edible product.

In general, one method of cleaning scallops is commonly used. This method tears the viscera or innards from the scallop by rubbing the muscle and attached viscera against a rough surface. Because the scallop is firmer than the viscera, the rough surface engages and removes the viscera from the scallop.

Numerous methods are known for removing the innards in this manner. Reference can be made in that regard to U.S. Pat. Nos. 3,129,456, 3,257,684, 3,528,124, 3,562,855, 3,662,432, 3,665,554, 3,665,555, RE 31,527, 3,802,029 and 4,675,946.

While the processes disclosed in each of the above-listed patents each provide a means for removing the viscera from the scallop muscle, each of those processes exhibits certain deficiencies.

U.S. Pat. No. 4,675,946 to Bunge, the disclosure of which is incorporated herein by this reference, advantageously overcomes many of the deficiencies encountered with prior scallop processes. That is not to say that the Bunge process and apparatus cannot be improved and, in fact, the present invention constitutes an improvement in the Bunge processing concept and structure.

The Bunge structure includes a cylindrical drum or trommel defined by a plurality of elongated rollers having axes parallel to the axis of the drum. A drive mechanism is provided for driving the cylindrical drum to rotate about its longitudinal axis. At the same time, the rollers defining the cylindrical drum are rotated by a drive mechanism which causes alternating rollers to rotate in opposite directions. The rollers are covered with a frictional or roughened material to grip the viscera and pull it from the edible muscle and pass it outwardly of the cylindrical drum.

As noted above, the Bunge structure has certain deficiencies. For example, it is necessary to provide a complex discharge mechanism at the downstream end of the trommel for removing the cleaned scallops from the trommel. Furthermore, as the trommel rotates, there is a possibility that some scallops will travel through the length of the trommel very quickly without having the opportunity to contact with the rubbing material and, therefore, without proper cleaning.

It would therefore be desirable to provide a method and apparatus for eviscerating scallops, of generally the type described in Bunge but which includes a structure for reliably propelling the scallops along the length of the apparatus and from which the cleaned scallops can be removed without difficulty, while keeping the scallops in the trommel sufficiently in contact with the rubbing area to allow for sufficient cleaning.

SUMMARY OF THE INVENTION

The present invention provides an improved apparatus and method for eviscerating scallops and other shellfish. The scallop cleaning apparatus of the invention includes cylindrical drum or trommel having side walls formed from a plurality of rollers which are mounted between a pair of rims which define the longitudinal ends of the cylindrical drum. A drive mechanism is provided for rotating the drum or trommel about its longitudinal axis. A drive mechanism is also provided for rotating adjacent rollers to rotate in opposite directions. Each of the rollers has a frictional surface to allow adjacent rollers to grip the viscera and pull it from the scallops as the rollers are rotated.

As shown, the first end of the drum is elevated with respect to the second, downstream end. Thus, as the drum is rotated, the scallops spirally progress through the drum.

In accordance with the invention, plates are mounted within and rotate with the drum to divide the drum into a plurality of sections. Dividing the drum ensures sufficient contact of the scallops being cleaned with the viscera removing rollers and allows the capacity of the drum to be maximized.

In accordance with a further aspect of the present invention, to discharge the cleaned scallops from the drum processor, longitudinal plates are mounted to the rims of the cylindrical drum at spaced locations about the circumference of the drum. By longitudinally shifting a sliding door-like plate at the downstream end of the drum, an opening of variable size is defined for allowing cleaned scallops to exit the drum and be collected for further processing.

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification, wherein like reference numerals designate corresponding parts in the various figures.

DETAILED DESCRIPTION OF THE INVENTION

Figure 1:
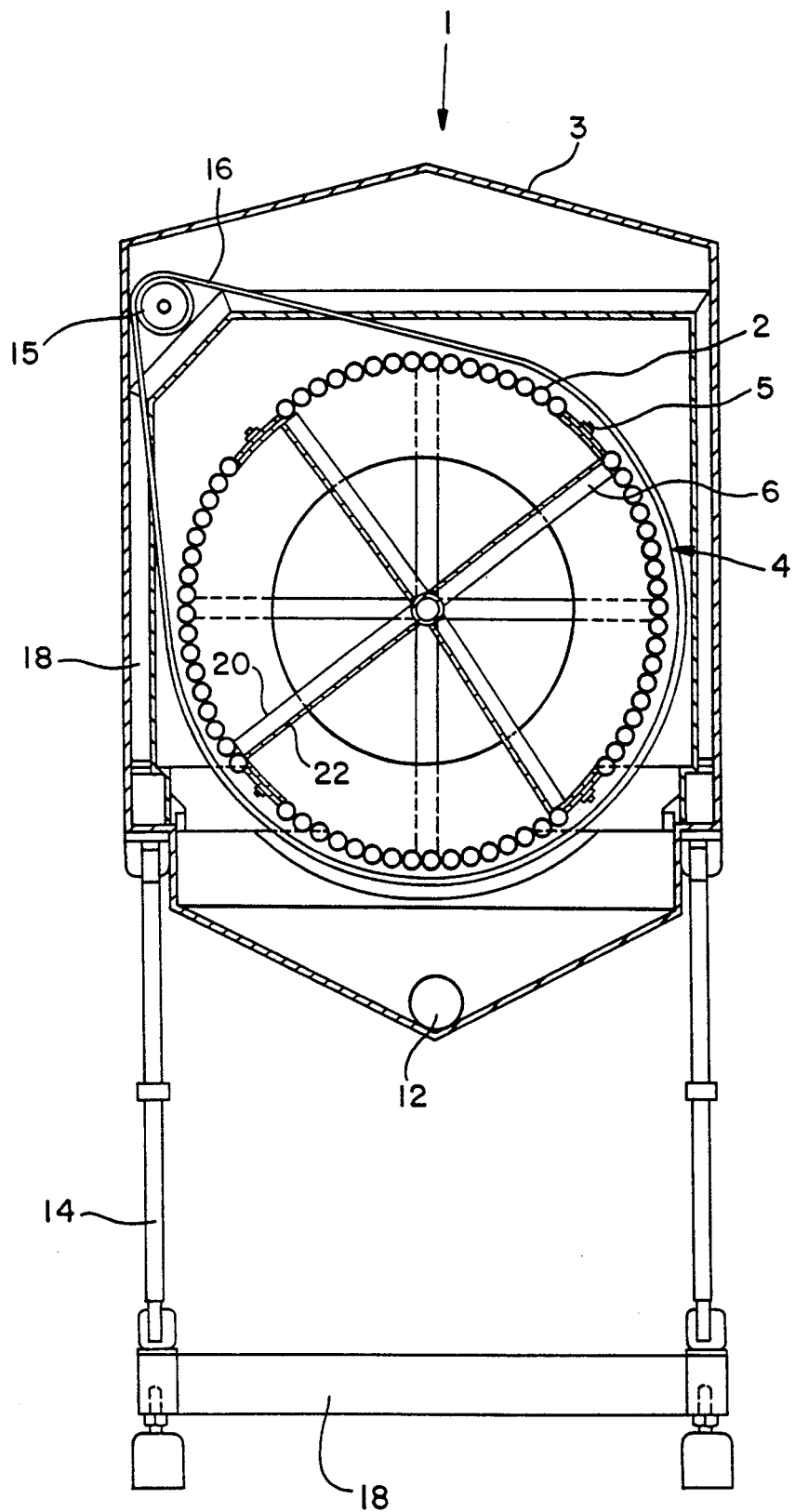
FIG. 1 is an end elevational view of the scallop cleaning apparatus provided in accordance with the invention with some parts omitted for clarity.

The scallop cleaning apparatus 1 provided in accordance with the invention includes a cylindrical drum or trommel 4 having side walls formed from a plurality of rollers 2 mounted between a pair of rims which define the longitudinal ends of the drum. The rims are mounted onto a frame 3, 18 which supports the apparatus.

A drive mechanism is provided for rotating the cylindrical drum or trommel about its longitudinal axis. Any suitable known drive mechanism can be provided to rotate the drum. In the illustrated embodiment, a drive belt or chain 16 is engaged with a rim of the cylindrical drum and is driven to rotate the drum by a drive motor schematically shown at 15. A drive mechanism is also provided for rotating the rollers about their respective axes. The rollers are driven so that adjacent rollers rotate in opposite directions. The drive mechanism for rotating the rollers is schematically illustrated at 11 and advantageously includes a plurality of gears mounted to the ends of the rollers 2 so that adjacent gears interdigitate, whereby engagement of the drive gear with the gear of one roller will translate rotational motion to the other rollers with adjacent rollers rotating in opposite directions. A similar drive mechanism is disclosed in U.S. Pat. 4,675,946 although other known drive mechanisms could be provided for effecting the desired rotation of the rollers.

Scallops are fed, via a chute 9, to the inlet end of the drum where the processing begins. The chute 9 is provided to allow the scallops to be fed into the drum without becoming embedded in the drive mechanism 10 for the drum or the rollers.

As shown, the first end of the drum is elevated, preferably adjustably, with respect to the second, downstream end. Thus, as the drum is rotated, the scallops spirally progress through the drum. In the illustrated embodiment, to provide the desired adjustable inclination of the drum, the downstream end 12 is adjustably supported with an adjustment mechanism 14, such as a hydraulic or pneumatic cylinder. As is apparent, the inclination of the drum, which is determined by the position of the adjustment mechanism 14 influences the rate at which the scallops pass through the drum.

Each of the rollers 2 is formed with or covered with a friction enhancing surface to allow the adjacent rollers to grip the viscera and pull it from the scallops as the rollers are rotated. More particularly, the opposite rotation of adjacent rollers combined with the roughened surface of the rollers grip and pinch the viscera in the nip between the adjacent rollers and pull it from the muscle. The scallop continues its travel within the drum from the first end to the second end. The innards, on the other hand, which are passed by the rollers from the interior to the exterior of the drum, are released by the rotating rollers and fall down into a receiving drawer 13 for ultimate collection and disposal.

Figure 2:
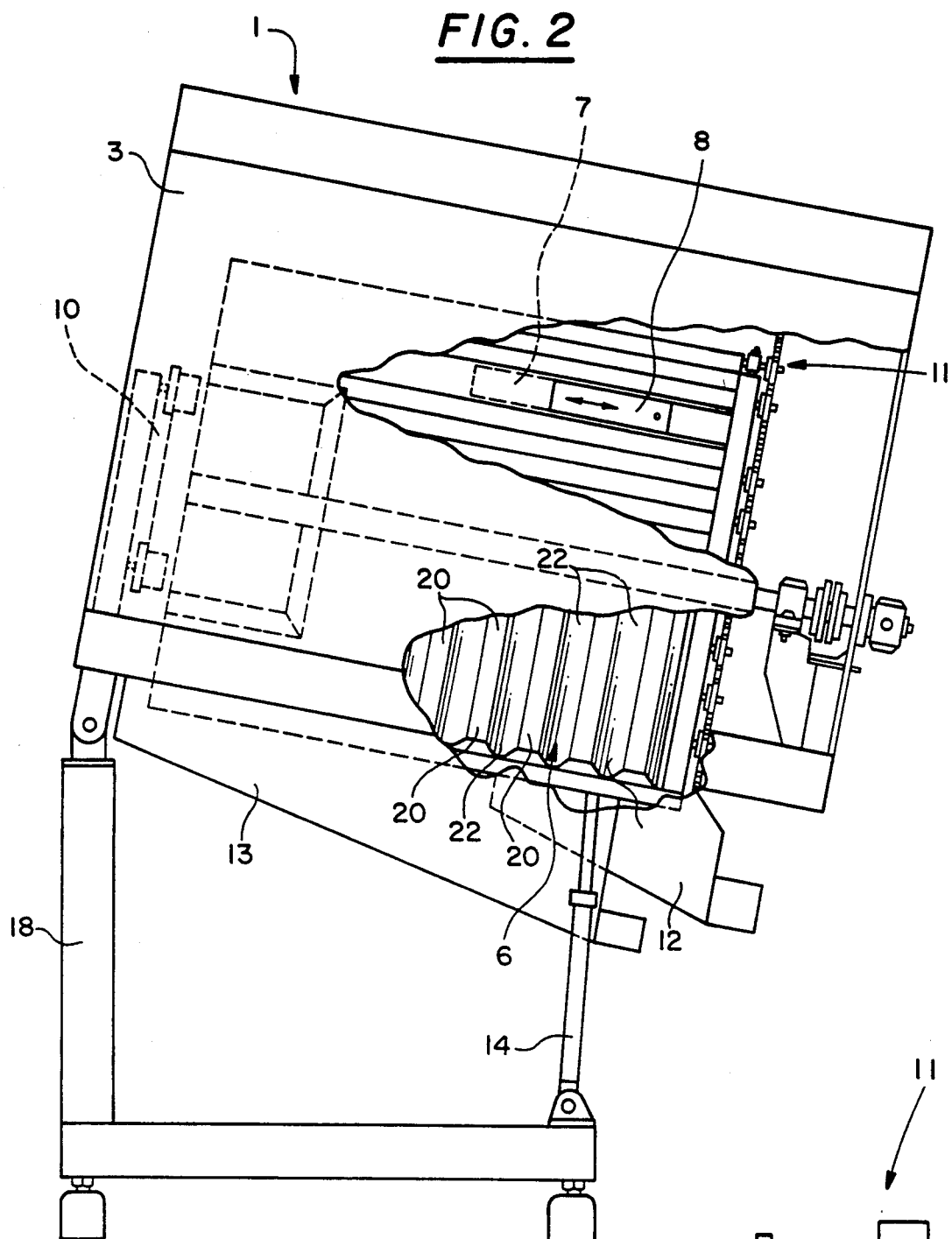
FIG. 2 is a side elevational view of a scallop cleaning apparatus in accordance with the invention.
Figure 2A:
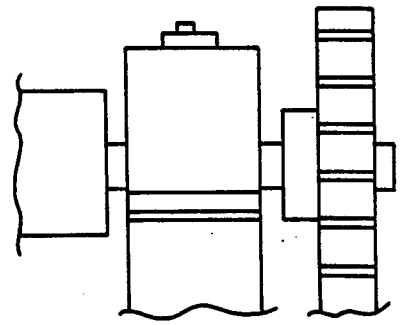
FIG. 2A is an enlarged view of detail A in FIG. 2.
Figure 3:
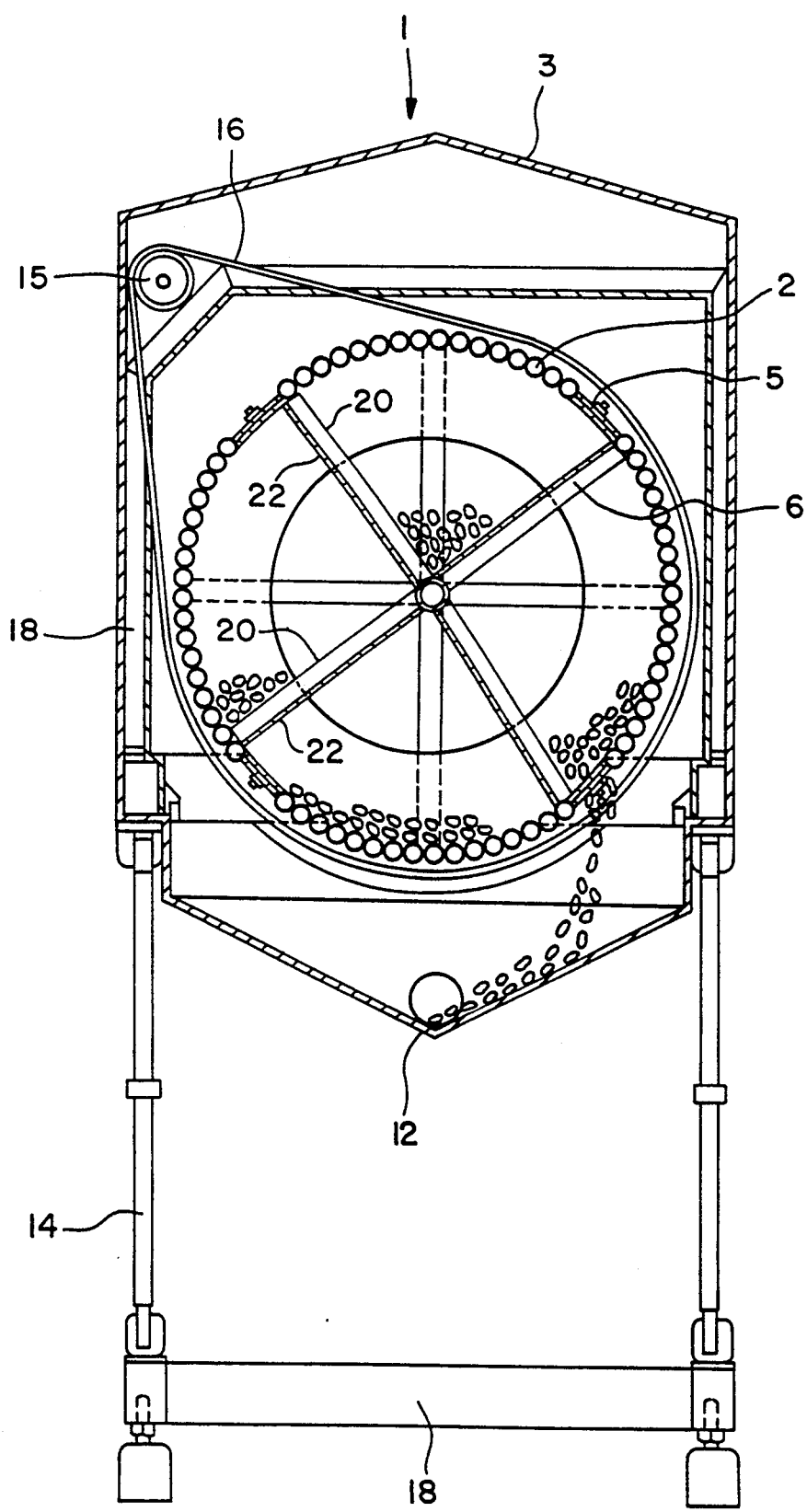
FIG. 3 is an end elevational view similar to FIG. 1 but showing the processing of scallops within the apparatus.
Figure 4:
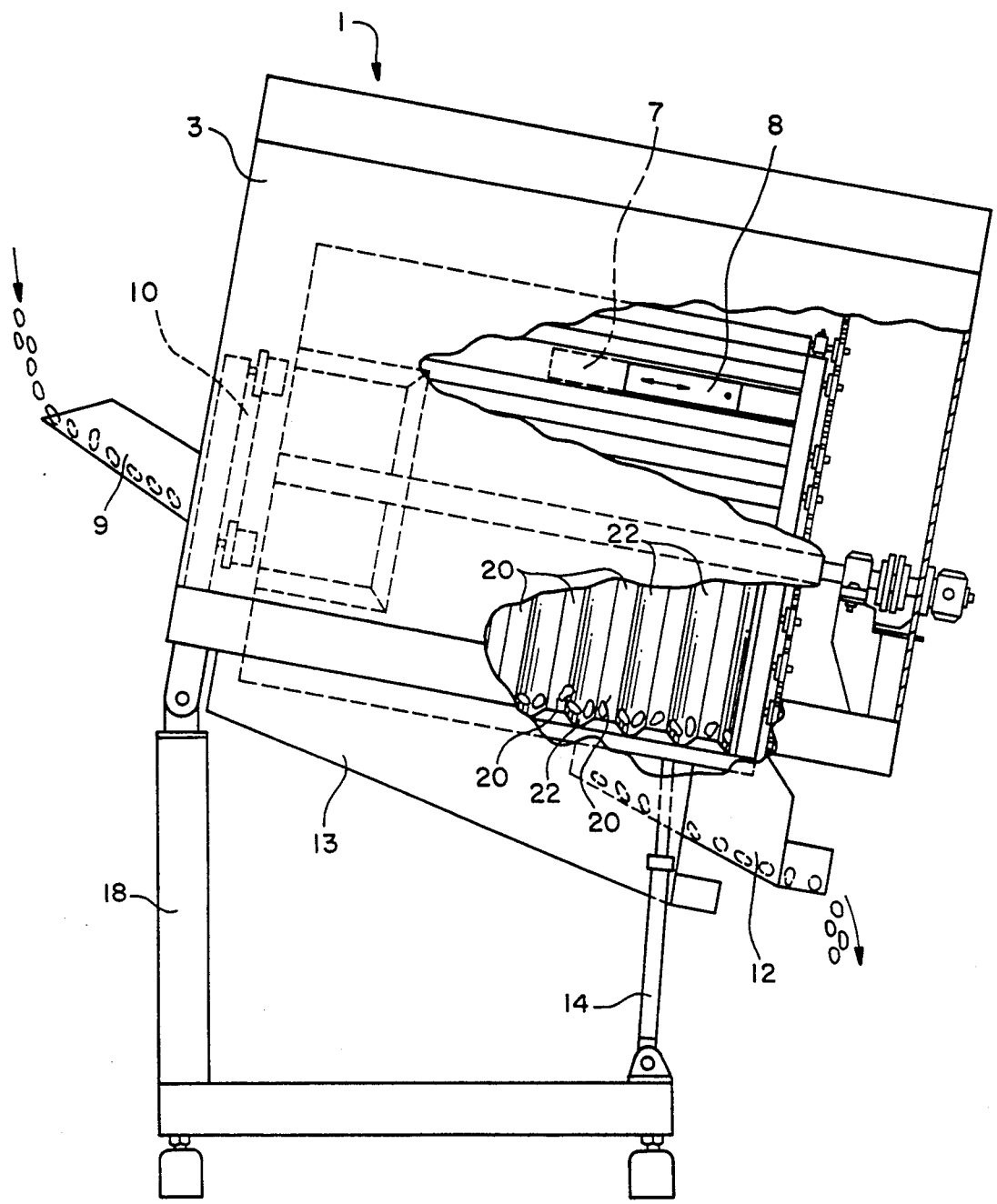
FIG. 4 is a side elevational view similar to FIG. 2 but showing the processing of scallops in accordance with the invention.
Figure 5:
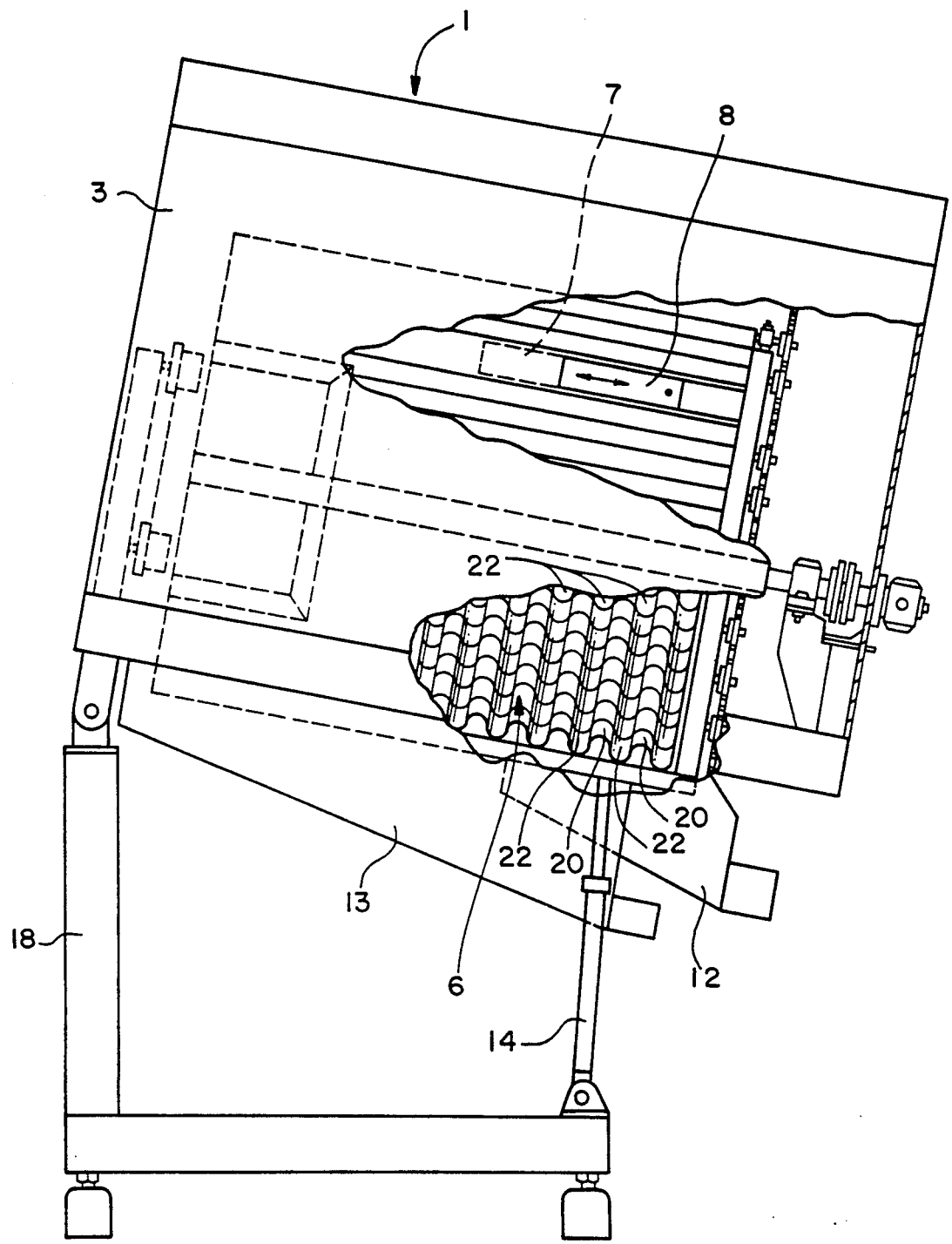
FIG. 5 is a view similar to FIG. 2, showing an alternate configuration of the divider plates in accordance with the invention.

In accordance with the present invention, plates 6 cross-sect the drum interior to divide it into a plurality of sections, four in the illustrated embodiment. The plates may be radial plates which emanate from the central axis of the drum to its side wall or plates which extend diametrically across the drum. In the preferred embodiment, the plates 6 have radial waves formed therein transverse to their longitudinal dimension to define radial grooves for guiding the scallops toward the cleaning rollers. The three dimensional configuration of the plates 6 can also be gleaned from FIGS. 1 and 5 wherein the crest or peak of the wave form is shown at 20 and the groove or valley is shown at 22. The peaks and valleys are also labeled in FIGS. 2 and 4. The waves may be accordion formed so that the grooves are triangular (FIG. 2) or the plates may be undulated to define smoothly curved grooves (FIG. 5).

Providing dividing plates 6 in accordance with the invention, slows the progression of the scallops and ensures that they will come into engagement with the alternating rollers 2 for a sufficient period to ensure complete removal of the viscera therefrom. Thus, providing a sectioned drum in accordance with the invention keeps the scallops for a longer time in actual contact with the rollers. Furthermore, the sectioning plates allow a larger number of scallops to be simultaneously processed because pile-up of scallops which may prevent some scallops from engaging the rollers or allow scallops to pass too rapidly, is minimized. Thus, the effectiveness of the apparatus as well as productivity are increased.

To allow discharge of the cleaned scallops from the drum processor, longitudinal plates 5 are mounted to the rims of the cylindrical drum instead of one or more rollers at spaced locations about the circumference of the drum. By longitudinally shifting plates 7, 8 at the downstream end of the drum, an opening of variable size can be defined, through which the scallops can exit the drum. Thus, when the scallops pass over the opening in the longitudinal plate in a particular sector, they are free to fall out of the drum and collected for further processing, such as freezing. By controlling the size of the opening, the residency of the scallops can be advantageously increased to decreased, as necessary or desired. As an alternative to providing sliding plate(s), the gap between adjacent rollers can gradually increase in the longitudinal direction of movement so that at the downstream end of the drum the rollers are sufficiently spaced to define an outlet opening for the eviscerated shellfish.

While the invention has been described in connection with what is presently considered to be the most practical and preferred embodiment, it is to be understood that the invention is not to be limited to the disclosed embodiment, but on the contrary is intended to cover various modifications and equivalent arrangements included within the spirit and scope of the appended claims.

What is claimed is:

1. An apparatus for eviscerating shellfish comprising:
   a frame;
   means defining a cylindrical drum having first and second ends, a longitudinal axis and a cylindrical sidewall, said drum defining means being mounted to said frame, said sidewall comprising a plurality of rollers, each of said rollers having a friction enhanced surface;
   means for rotating each said roller about the longitudinal axis thereof;
   means for rotating said drum about the longitudinal axis thereof; and
   means defining an outlet opening for eviscerated shellfish through said sidewall.

2. An apparatus according to claim 1, wherein said outlet opening means comprises at least one longitudinally slidable plate for defining an outlet opening of variable longitudinal dimension.

3. An apparatus according to claim 1, wherein at least two said outlet opening means are defined at spaced locations circumferentially about the sidewall of said drum.

4. An apparatus according to claim 1, wherein each of said rollers has a longitudinal axis oriented parallel to said longitudinal axis of said drum.

5. An apparatus according to claim 1, further comprising at least one shellfish distribution plate mounted within said drum to at least partially partition an interior of said drum.

6. An apparatus according to claim 5, wherein said at least one shellfish distribution plate extends radially between said sidewall and said longitudinal axis of said drum.

7. An apparatus according to claim 5, wherein at least said one shellfish distribution plate extends at least between said sidewall and said longitudinal axis of said drum.

8. An apparatus according to claim 7, wherein said at least one shellfish distribution plate extends radially with respect to said longitudinal axis of said drum.

9. An apparatus according to claim 7, wherein there are at least four shellfish distribution plates, mounted so as to divide the interior of the drum into equal sections.

10. An apparatus according to claim 7, wherein said at least one distribution plate divides the interior of the drum into at least two sections and at least one outlet opening means is defined in each said section.

11. An apparatus according to claim 5, wherein each said plate is wave-formed to define a plurality of transverse grooves.

12. An apparatus for eviscerating shellfish comprising:
   a frame;
   means defining a cylindrical drum having first and second ends, a longitudinal axis and a cylindrical sidewall, said drum defining means being mounted to said frame, said sidewall comprising a plurality of rollers, each of said rollers having a friction enhanced surface;
   means for rotating each said roller about the longitudinal axis thereof;
   means for rotating said drum about the longitudinal axis thereof; and
   at least one shellfish distribution plate mounted within said drum to at least partially partition an interior of said drum, said at least one shellfish distribution plate extending radially at least a substantial portion of the distance between said sidewall and said longitudinal axis of said drum.

13. An apparatus according to claim 12, wherein each said plate is wave-formed to define a plurality of transverse grooves.

14. An apparatus according to claim 13, wherein each said plate is undulated so as to have smoothly rounded groves.

15. An apparatus according to claim 13, wherein each said plate is accordion waved so as to have substantially triangular grooves.

16. An apparatus according to claim 12, further comprising means defining an outlet opening for eviscerated shellfish through said sidewall adjacent each said distribution plate.

17. An apparatus for eviscerating shellfish comprising:
   a frame;
   means defining a cylindrical drum having first and second ends, a longitudinal axis and a cylindrical sidewall, said drum defining means being mounted to said frame, said sidewall comprising a plurality of rollers, each of said rollers having a friction enhanced surface;
   means for rotating each said roller about the longitudinal axis thereof;
   means for rotating said drum about the longitudinal axis thereof; and
   at least one shellfish distribution plate mounted within said drum to at least partially partition an interior of said drum, said at least one shellfish distribution plate extending at the entire distance between said sidewall and said longitudinal axis of said drum.

18. An apparatus according to claim 17, wherein said at least one shellfish distribution plate extends radially with respect to said longitudinal axis of said drum.

19. An apparatus according to claim 17, wherein there are at least four shellfish distribution plates, mounted so as to divide the interior of the drum into equal sections.

* * * * *